May 5, 1970 J. SRAMCIK 3,509,954
DISPENSING SYSTEM
Filed Aug. 29, 1967 4 Sheets-Sheet 2
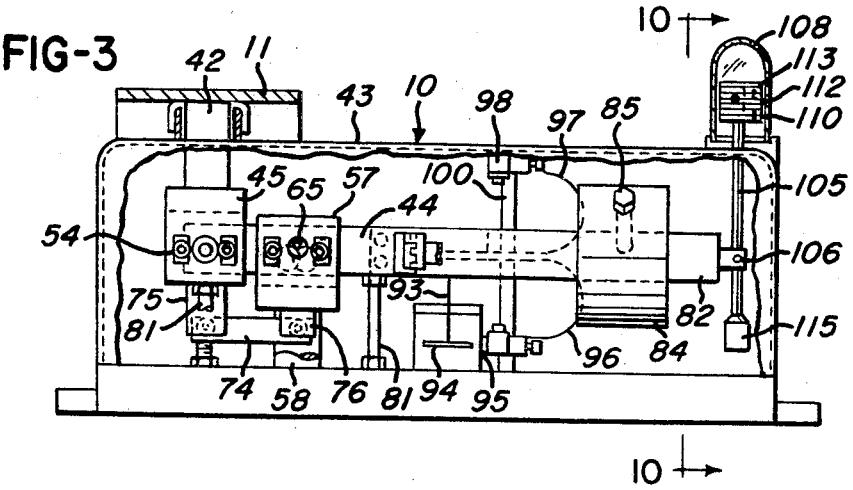
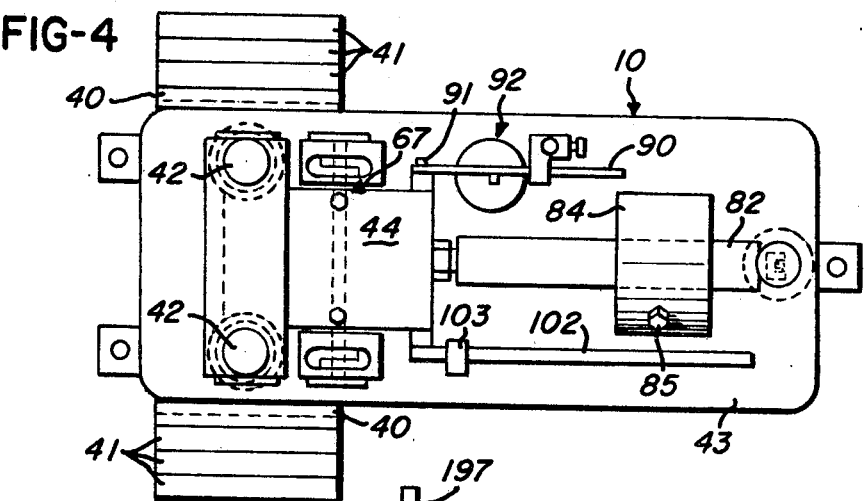
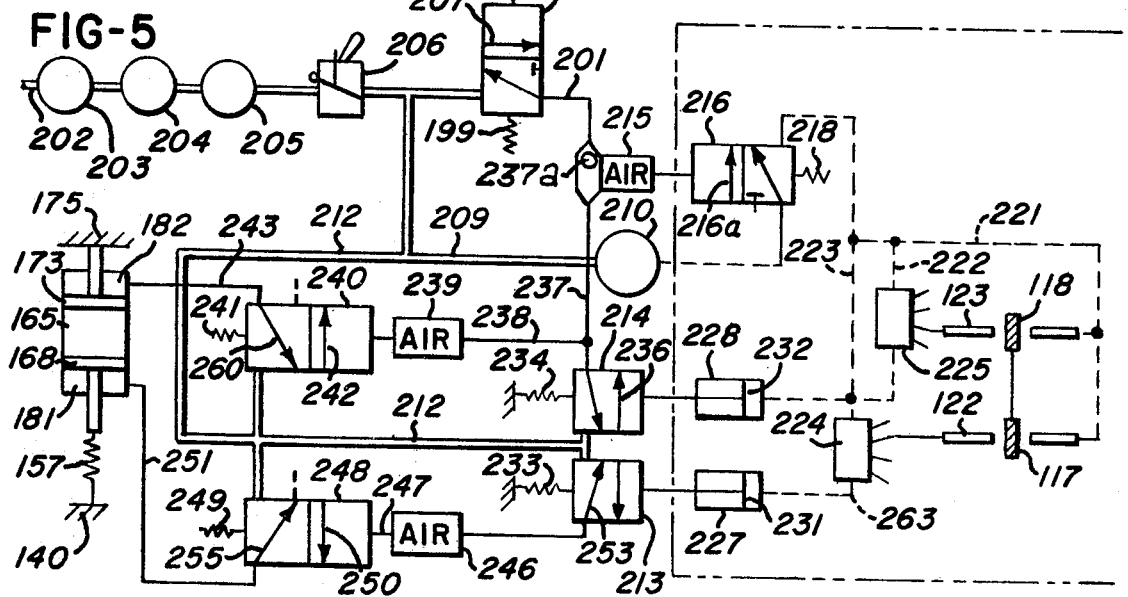

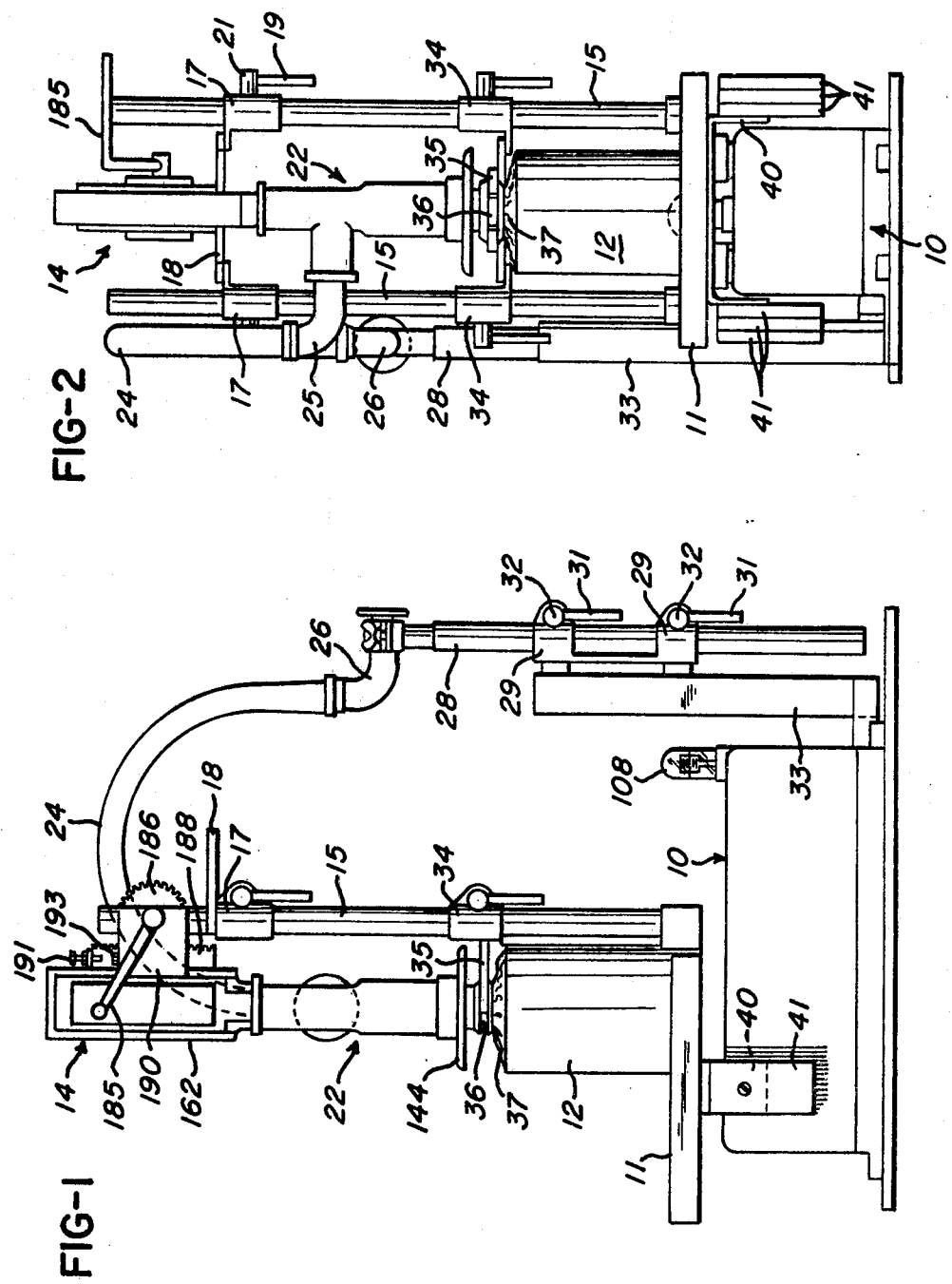

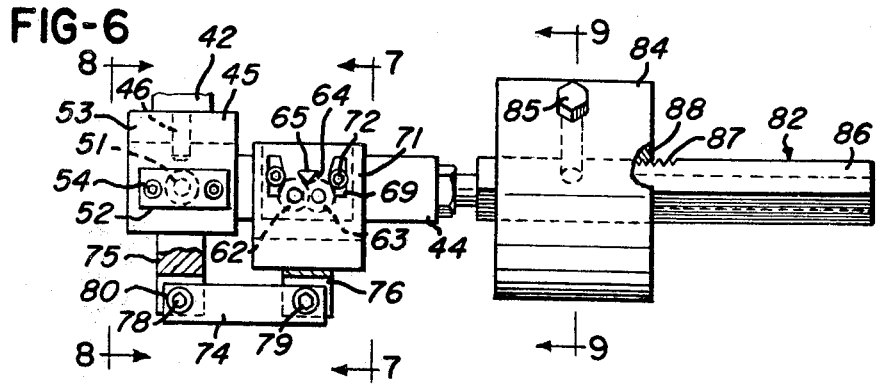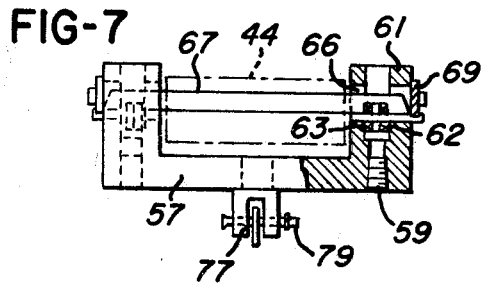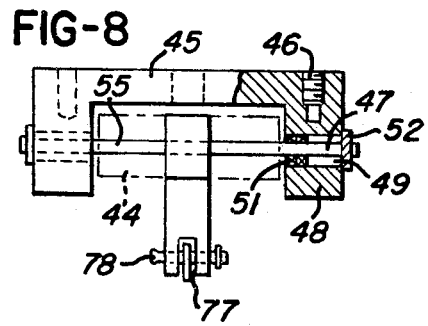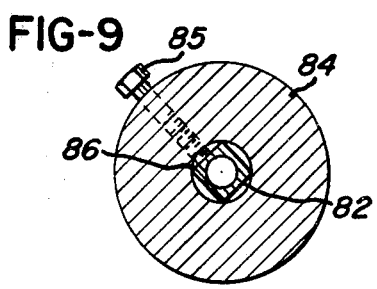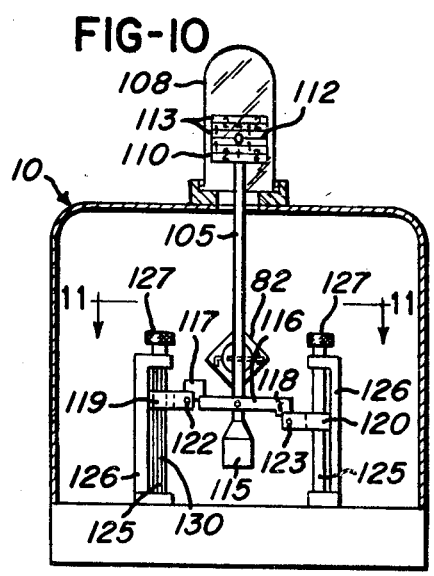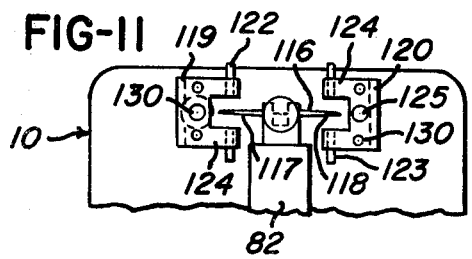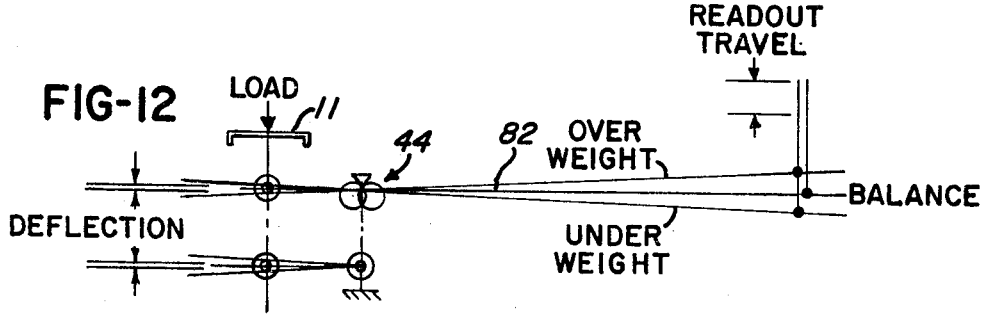

May 5, 1970  J. SRAMCIK  3,509,954
DISPENSING SYSTEM

Filed Aug. 29, 1967  4 Sheets-Sheet 4

United States Patent Office 3,509,954
Patented May 5, 1970

3,509,954
DISPENSING SYSTEM
John Sramcik, % Fill Pack Systems, Inc., P.O. Box 5096, Tri-Village Station, Columbus, Ohio 43212
Filed Aug. 29, 1967, Ser. No. 664,143
Int. Cl. G01g *13/02*
U.S. Cl. 177—122     5 Claims

ABSTRACT OF THE DISCLOSURE

An automatic dispensing system for liquid material wherein the flow of material into a container is controlled in response to the weight thereof. The system includes an improved weight sensor and a dual rate fill valve which automatically moves to a restricted position for limited flow when the container is almost full.

BACKGROUND OF THE INVENTION

In the filling of containers with liquid material, weighing devices are frequently used to determine when the proper volume of material has been placed into the container. In many cases, a visual watch must be kept on the weighing device to determine when the container approaches the full position so that the source of liquid material can be discontinued. Usually the rate of supply is gradually slowed in order to eliminate overflow or splashing and allow the container to be filled to a maximum extent. This slow feeding requires constant attention of the operator and additional filling time because it frequently is started before it is necessary and because it is slowed to a rate below that required to prevent splashing or overflow.

SUMMARY OF THE INVENTION

Accordingly, this invention provides a dispensing system wherein the control of the liquid material is completely automatic. The container is placed on the weighing apparatus and flow is automatically initiated to a fast feed condition until a preset quality of material is loaded into the container, and then the dispensing valve is shifted automatically to a slow feed position for the remainder of the filling operation after which the valve is automatically closed.

An improved check weighing device is provided which is easily adjustable for the weight required and which is substantially frictionless for precise comparative measurement at all times. The weighing device controls a dual rate fill valve which regulates the flow of material into the container. The flow valve has a fast feed position wherein it is fully opened and a slow feed position wherein a disk-shaped restrictor cooperates with a throat to substantially reduce flow from the valve. The valve can be easily and quickly disassembled for cleaning, and the flow during slow feed does not require precise positioning of the valve and valve actuator.

BRIEF DESCRIPTION OF THE DRAWINGS

FIG. 1 is a side elevation view of the dispensing apparatus in accordance with the invention;

FIG. 2 is a front view of the apparatus shown in FIG. 1;

FIG. 3 is a side view, partially broken away, of the weighing apparatus;

FIG. 4 is a top view of the apparatus shown in FIG. 3;

FIG. 5 is a schematic illustration of the control circuit for the system;

FIG. 6 is a side view of the lever arm for the weighing device;

FIG. 7 is a view partially in section taken generally along the line 7—7 of FIG. 6;

FIG. 8 is a view taken generally along the line 8—8 of FIG. 6;

FIG. 9 is a sectional view taken along the line 9—9 of FIG. 6;

FIG. 10 is a sectional view taken along the line 10—10 of FIG. 3;

FIG. 11 is an enlarged view taken along the line 11—11 of FIG. 10;

FIG. 12 is a schematic illustration of the operation of the weighing device;

DESCRIPTION OF THE PREFERRED EMBODIMENT

Figure 13:
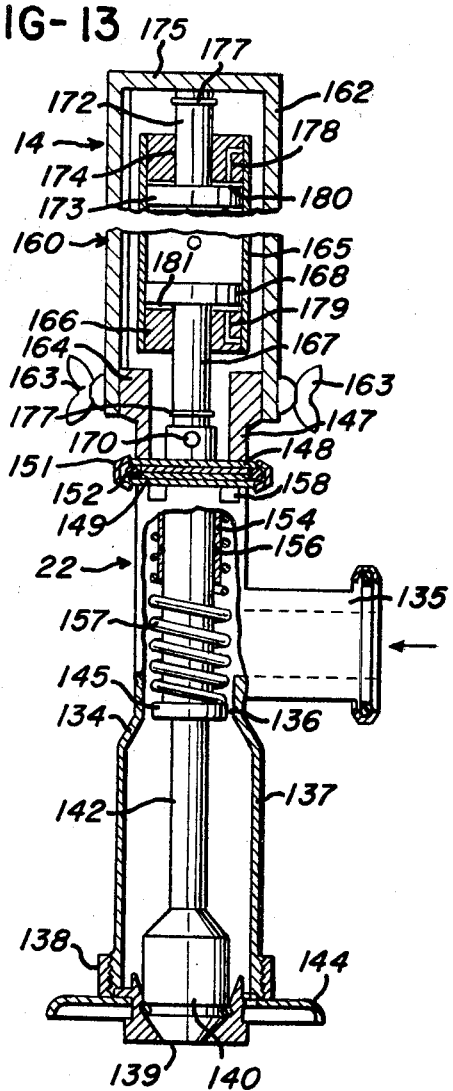
FIG. 13 is an elevation view, partially in section, of the dispensing valve and its actuator in the closed position.

FIGS. 1 and 2 illustrate the apparatus in accordance with the invention including a base 10 adapted to house the weighing device and having a weighing platform 11 mounted thereon adapted to receive the container 12 to be filled. The weighing platform 11 supports the fill valve assembly 14 which is adjustably mounted in position to accommodate containers of different vertical heights. Thus the parallel upright members 15 extend from either side of the weighing platform 11 and have the slidable collars 17 mounted thereon with the cross member 18 therebetween for supporting the valve assembly 14. The handles 19 are utilized to loosen the screws 21 which clamp and unclamp the collars 17 to the respective upright members 15 for vertical adjustment thereof.

The fill valve assembly 14 has the source of the material to be placed in the container 12 connected thereto through the inlet pipe 24 which has one end 25 connected to the valve assembly 14. The other end 26 is supported by the upright member 28 adjustably mounted in the collars 29 having the handles 31 and screws 32 for clamping and unclamping the collars in place for vertical adjustment. These collars are in turn supported on the frame member 33 which is connected to the base 10. A pair of similar collars 34 are used to adjustably support the bracket 35 which receives the neck 36 on the plastic liner 37 in the container to align it with the valve assembly 22.

The weighing platform 11 is generally U-shaped and includes the downwardly extending side portions 40 adapted to receive releasably one or more weights 41 for balancing the scale, as will be further described. This platform is carried by two cylindrical posts 42 (FIGS. 3 and 4) which extend through the top surface 43 of the base 10 and are operatively connected to the elongated pivot lever 44, as shown in FIG. 3. Specifically, the posts 42 are rigidly connected to the forward pivot yoke 45 by engaging the threaded bores 46 therein (FIG. 8). The yoke is then pivotally secured to the lever 44 by the pivot rod 47 which extends through the downwardly extending arms 48 of the yoke and is supported in the bores 49 by the frictionless ball bearings 51 of conventional design. End caps 52 (FIG. 6) are secured to the outer surfaces 53 of the yoke by the screws 54 for limiting axial movement of the pivot rod 47 while presenting little or no frictional resistance to its movement. The pivot rod 47 extends through a suitable bore 55 in the end of the lever 44.

The fulcrum for the lever 44 is positioned by the center yoke 57 (FIG. 7) which is rigidly supported in the base 10 by the upstanding columns 58 (FIG. 3) connected in the threaded bores 59 in the opposite sides of the yoke 57. The upstanding arms 61 of this yoke each includes a pair of ball bearings 62 and 63 which are axially offset to provide a groove 64 (FIG. 6) for receiving the apex of the elongated triangular pivot shaft 65 which extends between the aligned openings 66 in the arms 61 of the yoke and through a complementary bore 67 in the pivot lever 44. The end plates 69 are secured to the outside surfaces 71 of the yoke by the screws 72 and thus limit axial movement of the pivot shaft 65. Accordingly, the lever 44 pivots about the apex of the triangular pivot shaft 65 which rides in the groove 64.

In order to insure that the platform 11 moves in a vertical plane at all times, a check link 74 is provided to create a parallelogram which includes the downwardly extending link 75 (FIG. 6) on the forward yoke 45 and a short stem 76 on the center yoke 57. The link 75 and stem 76 have aligned slots 77 therein into which the check link 74 fits and is connected by the pivot rods 78 and 79. Ball bearings 80 are provided in the ends of the check link 74 to receive the pivot rods 78 and 79 for frictionless rotation thereon. The stops 81 (FIG. 3) are provided on each side of the fulcrum to limit the travel of the lever 44 and protect the weighing device against damage which might occur as a result of over-travel.

The lever 44 has an elongated extension bar 82 (FIG. 6) which is square in cross-section (FIG. 9) and has the weight 84 mounted thereon for adjustable movement in an axial direction on the bar. The manually releasable lock screw 85 engages a flat surface 86 of the bar to lock the weight in position. In the preferred embodiment, suitable grooves 87 are provided along the length of the bar to receive the lip 88 on the weight 84 so that axial adjustment thereof effects a preset lever force on the pivot lever 44, e.g., each groove can provide an adjustment of six pounds.

An elongated rod 90 extends parallel to the extension bar 82 on one side thereof, as shown in FIG. 4, and is rigidly secured in place by the conventional fastening means 91. This bar is connected to the hydraulic damper 92 through the piston rod 93 having the piston 94 thereon adapted to reciprocate slowly in the cylinder 95 of hydraulic damper 92 to provide for smooth operation of the weighing device and to minimize lever oscillation.

The rod 90, and thus the lever 44, are continually urged toward a neutral or central position by the loop springs 97 and 96 of tempered spring steel. One end of these loops is supported by the vertically adjustable collars 98 on the vertical post 100 adjacent hydraulic damper 92, and the other ends thereof are connected to the bar 90 with one of the springs being disposed above and the other below the bar to urge it toward a neutral centered position. By adjusting the collars 98 on the post 100 the bias of springs 97 and 96 can be individually adjusted to insure that the lever is urged toward the neutral or centered position. On the opposite side of the lever 44, another elongated rod 102 is rigidly secured parallel to the extension 82 and has the small weight 103 thereon which can be moved along the length of the rod 102 for the purpose of making fine adjustments in the balancing of the lever 44, as will be described.

Apparatus is provided at the end of the extension bar 82 for operating the automatic controls and for providing a visual readout of the weighing device. Thus a vertical rod 105 is pivotally secured by the pin 106 on the end of the extension bar 82 and extends upwardly into a dome-shaped transparent housing 108. The upper end of the rod has an indicator 110 thereon which cooperates with a zero-line 112 on the housing 108 for indicating whether or not the scale is balanced, overweight, or underweight. The several graduations 113 thereon facilitate readings when the indicator 110 is near its balanced position. The weight 115 is provided on the lower end of the rod 105 to provide a pendulum effect which maintains the rod 105 in a vertical position even though the lever 44 and extension bar 43 have been shifted from the horizontal position.

Mounted rigidly on the vertical rod 105 is the flat S-shaped interrupting member 116 (FIG. 10) having the precisely shaped flag sections 117 and 118 on the ends thereof for cooperating with the U-shaped sensing elements 119 and 120, respectively. A fluid passage 122 and 123 is provided in each of the arms 124 of these elements for the flow of low pressure air from between the passages of each element 119 and 120 except when interrupted by the flag sections 117 or 118 which are moved therebetween by the movement of the extension bar 82. These sensing elements can be adjusted in vertical direction by the screws 125 supported for rotation in the brackets 126 so that when the knobs 127 on the upper end of the screws 125 are rotated, appropriate vertical adjustment of the sensing elements occurs. Rotation of the sensing elements 119 and 120 is prohibited by the parallel rods 130 (FIG. 11) on either side of each screw 125 and which extend through appropriate openings in the elements.

The weighing device is easily adjusted so that the precise weight of material is placed in the container 12. Thus the large weight 84 (FIGS. 6 and 12) is moved along the length of the extension bar 82 to provide the major force which must be overcome to balance the lever 44 by the filling of the container. This weight together with the fine adjustment accomplished by moving the small weight 103 (FIG. 4) on the rod 102 urge the lever 44 in a clockwise position as viewed in FIG. 12. The lever 44 becomes balanced when the weight on the platform 11 reaches a preset level which has been previously calculated to occur when the container is filled to the precise level desired. Thus the load on the platform urges the lever in the counterclockwise direction, as viewed in FIG. 12. Adjustments can be made by adding and subtracting the weights 41 on the sides of the platform 11 so that quick adjustment can be made for different weights of material and different size containers.

The weighing device also operates with very little or no friction so that precise comparative weighing is accomplished. This results from the fact that the pivotal movements on the lever 44 are accomplished in a frictionless manner by use of the ball bearings 51, 62, 63 and 80 around the various pivot shafts 55, 65, 79 and 71. Thus the lever movement is very sensitive and free from friction drag present in many prior art devices. In addition, the parallelogram created by the links 74 and 75 and the stem 76 prevents any tilting of the platform 11 since the link 75 and the posts 42 must move in a vertical direction due to this parallelogram.

Figure 14:
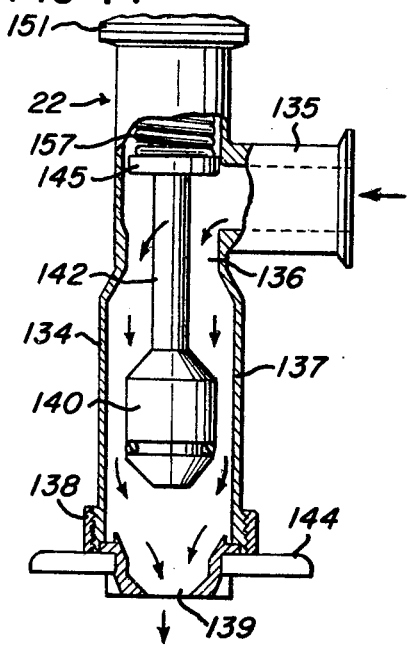
FIG. 14 is a view similar to FIG. 13 showing the valve in its fast feed position.
Figure 15:
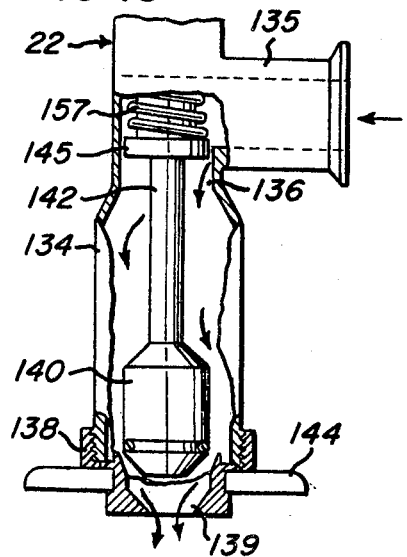
FIG. 15 is a sectional view similar to FIG. 14 but showing the valve in its slow feed position.

Referring now to the valve assembly 14, as shown in FIGS. 13–15, the valve housing 134 includes a horizontal inlet 135 to the restricted throat 136 of the housing. The enlarged intermediate portion 137 of the housing leads to the removable nozzle 138 having the outlet opening 139 defined thereby which is opened and closed by the valve 140 on the end of the elongated actuator shaft 142. A horizontal drip shield 144 is provided on the nozzle 138 to prohibit moisture which might condense on the housing 134 from dripping onto the container being filled. The disk 145 which is rigidly secured on the actuator shaft 142 cooperates with the restricted throat 136 to provide for limited flow therebetween when the valve assembly 22 is in the slow feed position, as shown in FIG. 15.

The housing insert 147 is secured in the upper end of the housing 134 and includes the annular flange 148 which is clamped to the similar flange 149 on the top of the housing 134 by the manually releasable clamp 151 of conventional design. The O-ring seal 152 is interposed between the flanges 148 and 149 for providing a fluid tight seal therebetween. The insert 147 also includes the downwardly extending tubular section 154 which receives the upper end of the actuator rod 142 (FIG. 13). An O-ring seal 156 is provided between the inside surface of this tubular section and the actuator rod 142 for blocking the flow of fluid therebetween. The coil spring 157 surrounds the rod 142 and tubular section 154 and is interposed between the disk 145 and the shoulder 158 on the housing insert 147 to urge the rod 142 downward to seat the valve 140.

The actuator 160 is removably secured on the top portion of the housing insert 147 and includes a cylindrical cover 162 adapted to be releasably secured to the housing insert 147 by the wing nuts 163 which engage suitably threaded studs extending radially from the upper flange portion 164 of the housing insert. The actuator further includes the movable cylinder 165 having a lower head 166 through which the piston rod 167 extends to a rigid connection with the lower piston 168. A pin 170 releasably connects the other end of the piston rod 167 to the actuator rod 142. Another piston rod 172 extends from a rigid connection with the upper piston 173 through the upper head 174 of the cylinder 165 to a connection with the top wall 175 of the cover 162. Each of the piston rods 167 and 172 has a retaining ring 177 mounted thereon for limiting the stroke of the pistons especially during assembly of the actuator 160. The air passages 178 and 179 lead to the chambers 180 and 181 between the pistons 168 and 173 and adjacent cylinder heads.

The valve assembly 14 is raised and lowered manually by the crank 185 (FIG. 1) which rotates the gear 186 mounted for rotation on the cross member 18. The gear cooperates with a rack 188 mounted on the adjacent surface of the cover 162 with the side plates 190 providing supporting guides for limiting relative movement between the valve assembly 14 and the post 15 to a vertical direction. The adjustable screw 191 is utilized to contact the microswitch 193 which indicates when the valve assembly 14 has been lowered into its operative position, as will be further described.

OPERATION

The air and electrical systems for the apparatus are now best described in connection with the operation thereof with particular reference to FIG. 5. Accordingly, assuming that the weighing device is properly adjusted and set up and it is desired to fill a container 12 having a plastic liner 37 therein, the container is placed on the platform 11 and the neck 36 of the liner inserted into the bracket 35 which has been adjusted to the proper height. The valve assembly 14 is lowered by rotation of the crank 185 until the nozzle 138 is disposed adjacent the bracket 35 in alignment with the neck 36 of the liner 37.

As the valve assembly reaches its lower position, the microswitch 193 is actuated to energize the valve actuator 197 and shift the control valve 198 against the spring 199 and permit air to flow into the line 201 from the line 202 through the filter 203, pressure regulator 204, lubricator 205, On-Off toggle switch 206 which has been moved to its On position, and the valve passage 207. When the toggle switch 206 was opened, the air was allowed to flow into the lines 209 leading to the pressure regulator 210 which provides a low pressure air in the line 211, and through the line 212 to the booster valves 213 and 214 which are normally disposed in their closed position.

Pressurization of the line 201 shifts the actuator 215 and valve 216 against the bias of the spring 218 to connect the low pressure air in the line 211 through the valve passage 216a to the lines 221, 222 and 223. The line 221 connects to the air passages 122 and 123 in the sensor elements 119 and 120 which have the flag sections 117 and 118 positioned therebetween except when the scale is nearly balanced. Since the container has not yet been filled these flag sections indicate the underweight condition. The low pressure air is supplied through the lines 222 and 223 to the amplifiers 224 and 225 which control the operation of the actuators 227 and 228 for the booster valves 213 and 214.

The amplifiers 224 and 225 are responsive to air flow through the passages 122 and 123, and when this flow is blocked by the flag sections 117 and 118, the amplifiers allow the air pressure in lines 222 and 223 to flow to the actuators 227 and 228 causing the pistons 231 and 232 to move to the left against the bias of the springs 233 and 234 to align the valve passages 253 and 236 of the booster valves with the line 212. This permits the air to flow through the line 237 to the actuator 215 to hold the valve 216 in the open position and through the line 238 leading to the actuator 239 which shifts the valve 240 to the left against the bias of the spring 241 and connects the high pressure air to the upper chamber 182 of the valve actuator through the valve passage 242 and line 243. At the same time, the passage 253 connects the high pressure air to the actuator 246 through the line 247 which shifts the valve 248 to the left against the spring 249 and allows the high pressure air to flow through the valve passage 250 and into the line 251 leading to the lower chamber 181 in the valve actuator.

When the high pressure air is connected to the chambers 181 and 182 in the valve actuator 160, the pistons 168 and 173 move toward each other so that the cylinder 165 moves upwardly with respect to the housing 134 and the lower piston 168 moves upwardly with respect to the cylinder 165. This causes the actuator rod 142 to be moved upwardly to the fast feed position (FIG. 14) wherein the valve 140 is spaced a substantial distance above the nozzle 138 and the disk 145 is disposed above the inlet opening 135. In this fast feed position, the material flows under pressure into the valve housing 134 from a suitable source and through the outlet opening 139 into the container 12. The flow continues until the container 12 is nearly full at which time the lever 44 and extension 82 of the check weighing device move the vertical rod 105 with the flag sections 117 and 118 thereon to a position wherein the flag section 117 is removed from between the passages 122 in the sensor element.

As a result, the low pressure air is supplied through the passage 122 to the amplifier 224 causing turbulence within the amplifier which in turn deflects low pressure away from line 263 which ceases to supply air through the line 263 to the actuator 227 so that the spring 233 shifts the valve to the right (FIG. 5) and terminates flow of air into the line and connects actuator 246 to the atmosphere through the valve passage 253. The spring 249 thus shifts the valve 248 to the right to connect the lower chamber 181 to the atmosphere through the passage 255 so that the spring 157 in the valve housing 134 moves the valve 140 toward the nozzle 138.

Since the air pressure still is connected to the upper chamber 182, the valve 140 does not return to engagement with the nozzle 138 but rather is spaced therefrom a short distance in the slow feed position. However, the restrictor disk 145 is moved downwardly into the throat 136 for cooperation therewith to provide for limited flow of material between the disk 145 and the throat 136 so that the liquid material flowing from the outlet 137 is greatly reduced to a dribble into the container. The cooperation between the disk 145 and throat 136 does not require critical tolerances on the movement of the actuator rod 142 since the throat has a relatively long length so that minor variations in the axial position of the disk 145, which might result from wear, do not change the rate of flow of the material when the valve assembly 14 is in this slow feed position. Moreover, since the limited flow is not created between the valve and the nozzle, there is no spraying or turbulence as would occur at the outlet opening but rather a slow dribbling flow.

The valve remains in this slow feed position until the weighing device senses that the container 12 is completely filled or filled to the desired level, at which point the lever 44 and extension 82 move the flag section 118 from alignment between the passages 123 to permit the flow of air therebetween. As a result, the low pressure air flow to the amplifier causes the amplifier 225 to terminate flow from the line 222 to the actuator 228 for the booster valve 214. The spring 234 then returns the booster valve to the right terminating the flow of high pressure air to the actuator 239 which shifts the master valve 240 to the right. This vents the upper chamber 182 of the valve actuator through the passage 260 so that the spring 241 is allowed to return the valve 140 into engagement with the nozzle 138 thereby immediately terminating flow into the container 12.

Also, the air in the lines 201 and 237 is vented by closing of the valves 198 and 214 so the spring 218 returns the valve 216 to the left to terminate the flow of low pressure air to the amplifiers 224 and 225. During the cycle, the check valve 237a permits the pressure on line 237 to extend the actuator 215 and hold it in position during the cycle by the air supplied through the valve 214. The system is now returned to the same position it was prior to starting. An operator then raises the valve assembly 14 by use of the crank 185, removes the filled container 12 and replaces it with an empty container, and lowers the valve assembly 14 until the microswitch 193 is again closed which then repeats the cycle described above.

The valve assembly can be easily disassembled for cleaning as required by the various sanitary codes and when the type of materials being handled thereby are to be changed. It is merely necessary to remove the clamp 151 to separate the actuator and intermediate housing 147 from the housing 134. The actuator shaft 142 can thus be removed from the housing and the latter cleaned. Similarly, the nozzle 138 can be unscrewed for cleaning or for replacement with a nozzle of a different size or configuration depending upon the container being filled. Another important feature of the valve is that the spring 157 will automatically close the valve 140 if the pneumatic system should lose pressure for any reason. Thus failure of the system will normally result in the valve 140 being closed, rather than opened which would permit the material to overflow.

While the invention has been shown and described as having a pneumatic control system, it is within the scope of this invention to provide hydraulic or electrical, or a combination thereof to accomplish the desired results. The advantage of the pneumatic system is that it does not require electrical power except to create the air pressure which may be done at a point remote from the dispensing apparatus. Moreover, the invention can be used to handle many solid-liquid mixtures and finely powdered materials which flow similar to liquids.

The invention has thus provided an improved dispensing system which automatically fills a container at optimum speed to a precise level without the attention of an operator after the filling operation has been initiated. An improved comparative weighing mechanism has been provided which is frictionless for precise check weighing, and for operating a control system for automatically shifting the valve between the fast and slow feed positions as well as the Off position.

While the form of apparatus herein described constitutes a preferred embodiment of the invention, it is to be understood that the invention is not limited to this precise form of apparatus, and that changes may be made therein without departing from the scope of the invention.

What is claimed is:

1. In a dispensing system for filling a container with a predetermined weight of liquid material, including a frame, means mounted on said frame for weighing the container as it is being filled, and means for sensing said weighing means to indicate when a predetermined weight is placed into said container, an improved fill valve assembly comprising a tubular housing, means defining an inlet within said housing and adapted to be connected to a source of liquid material, means defining an axial outlet in said housing, means defining a restricted throat in said housing between said inlet and said outlet, a valve member disposed within said housing and including closure means and restrictor means in axially spaced relation, said valve member being movable between a closed position where said closure means engage said housing adjacent said outlet and a fast flow position where said closure means is spaced from said outlet and said restrictor means is spaced from said throat, said valve member being further movable through a slow flow position where said restrictor means cooperates with said throat defining means to limit substantially the flow of material through said throat and said outlet, and actuator means for moving said valve member between said closed and fast flow positions through said slow flow position in response to actuation of said sensing means.

2. A dispensing system as defined in claim 1 wherein said weighing means include a lever adapted to pivot in response to a predetermined weight, said sensing means include a U-shaped sensing element mounted adjacent the path of said lever, aligned air passages in the arms of said element adapted to provide a flow of air therebetween, and means carried by said lever for interrupting the air flow between said passages when said lever pivots.

3. A dispensing system as defined in claim 2 wherein a pair of said sensing elements are utilized for cooperation with a pair of said interrupting means, one of said elements and one of said interrupting means being effective to control said actuator means for moving said valve member to said slow feed position and the other of said elements and said interrupting means being effective to control said actuator means for moving said valve member to said closed position.

4. A dispensing system as defined in claim 3 wherein said sensing elements are vertically adjustable with respect to said lever.

5. In a dispensing system for filling a container with a predetermined weight of liquid material, including a frame, means mounted on said frame for weighing the container as it is being filled, and means for sensing said weighing means to indicate when a predetermined weight is placed into said container, an improved fill valve assembly comprising a tubular housing, means defining an inlet within said housing and adapted to be connected to a source of liquid material, means defining an axial outlet in said housing, a valve member supported for axial movement within said housing between a fast flow position and a closed position through a slow flow position, a movable cylinder disposed within said housing, a pair of pistons mounted for reciprocation in said cylinder, corresponding piston rods for said pistons and extending through opposite ends of said cylinder, each said piston and the adjacent end of said cylinder defining a pressure chamber, one of said piston rods being secured to said housing, the other of said piston rods connected to said valve member, means for selectively supplying air under pressure to said chambers for pressurizing either one of said chambers or both of said chambers to effect corresponding movement of said valve member to each of said positions.

References Cited

UNITED STATES PATENTS

| | | | |
|---|---|---|---|
| 2,264,562 | 12/1941 | Bryant et al. | 177—122 X |
| 3,058,538 | 10/1962 | Dawson et al. | 177—122 X |
| 3,106,230 | 10/1963 | Laun | 141—128 X |
| 3,109,561 | 11/1963 | Lohse et al. | 141—128 X |
| 3,349,859 | 10/1967 | Cox et al. | 177—118 |

STEPHEN J. TOMSKY, Primary Examiner

G. H. MILLER, Jr., Assistant Examiner

U.S. Cl. X.R.

141—128; 251—63.6, 121